(12) United States Patent
Prigent et al.

(10) Patent No.: US 8,857,172 B2
(45) Date of Patent: Oct. 14, 2014

(54) HYDRAULIC TRANSMISSION SYSTEM HAVING A MAIN PUMP THAT CAN BE ACTUATED CONTINUOUSLY

(75) Inventors: Andre Prigent, Saintines (FR); Benjamin Basson, Compiegne (FR); Jean Heren, Margny les Compiegne (FR); Philippe Lucienne, Aumont en Halatte (FR)

(73) Assignee: Poclain Hydraulics Industrie, Verberie (FR)

( * ) Notice: Subject to any disclaimer, the term of this patent is extended or adjusted under 35 U.S.C. 154(b) by 907 days.

(21) Appl. No.: 13/029,285

(22) Filed: Feb. 17, 2011

(65) Prior Publication Data

US 2011/0197574 A1    Aug. 18, 2011

(30) Foreign Application Priority Data

Feb. 18, 2010 (FR) .................................. 10 51164

(51) Int. Cl.
| | |
|---|---|
| F16D 39/00 | (2006.01) |
| F16D 31/02 | (2006.01) |
| B60K 17/356 | (2006.01) |
| F16H 61/4139 | (2010.01) |
| F16H 61/439 | (2010.01) |
| F16H 61/4035 | (2010.01) |
| B60K 23/08 | (2006.01) |

(52) U.S. Cl.
CPC .......... *F16H 61/4139* (2013.01); *B60K 17/356* (2013.01); *F16H 61/439* (2013.01); *F16H 61/4035* (2013.01); *B60K 23/0808* (2013.01); *B60K 23/08* (2013.01)
USPC .................... 60/488; 60/413; 60/468; 60/489

(58) Field of Classification Search
USPC ............ 60/413, 487, 488, 489, 468; 180/307, 180/365, 367
See application file for complete search history.

(56) References Cited

U.S. PATENT DOCUMENTS

| | | |
|---|---|---|
| 4,140,196 A | 2/1979 | Brewer |
| 5,117,936 A | 6/1992 | Nakamura et al. |
| 2008/0238187 A1 | 10/2008 | Garnett et al. |

FOREIGN PATENT DOCUMENTS

| | | |
|---|---|---|
| GB | 2 013 841 A | 8/1979 |
| WO | 2005/111475 A1 | 11/2005 |

OTHER PUBLICATIONS

European Search Report: FR1051164 FA732362, Aug. 2, 2010.

*Primary Examiner* — Michael Leslie
(74) *Attorney, Agent, or Firm* — Ladas & Parry LLP (57) ABSTRACT

A hydraulic transmission system for a vehicle is provided. The system includes a main pump serving to feed with fluid at least one hydraulic motor for driving a vehicle mover member; an auxiliary pump, the main pump and the auxiliary pump being suitable for being actuated jointly; and a "bypass" connection between a delivery orifice of the auxiliary pump and an unpressurized reservoir. In addition, a first constriction is arranged on the bypass connection, and configured to maintain a pump protection pressure in a pump protection portion of the bypass connection. This pressure is applied to the main orifices of the main pump when said pump is actuated but is not delivering, thereby ensuring that the pump is protected.

17 Claims, 6 Drawing Sheets

HYDRAULIC TRANSMISSION SYSTEM HAVING A MAIN PUMP THAT CAN BE ACTUATED CONTINUOUSLY

FIELD OF THE INVENTION

The invention relates to hydraulic transmission apparatus for a vehicle, the apparatus including a main pump serving to feed at least one hydraulic motor with fluid, an auxiliary pump serving to maintain some minimum fluid pressure in at least one auxiliary duct of the apparatus, and at least one hydraulic motor, the main pump and the auxiliary pump being suitable for being actuated jointly by drive means for the purpose of delivering pressurized fluid.

The drive means may be of any type, but in general they are constituted by an internal combustion engine, e.g. a diesel engine. A diesel engine is used in the following description in order to facilitate understanding. However, the description remains applicable regardless of the drive means actuating the pumps of the apparatus.

The invention relates in particular to apparatus of the above-indicated type that is used as supplementary or assistance apparatus on a machine or a vehicle. For example, such apparatus can be mounted on a vehicle so as to make it possible, whenever necessary, to actuate the hydraulic motor as a supplementary or assistance motor, for moving the vehicle under difficult movement conditions, such as slippery ground, steep slope, etc. Typically, the hydraulic motor is arranged on an axle of the vehicle; thus, when the hydraulic transmission apparatus is activated, the vehicle has additional driven wheels.

BACKGROUND OF THE INVENTION

A particularly important application of the invention relates to hydraulic assistance apparatus mounted on road vehicles such as heavy goods vehicles that can travel at some speed (over 50 kilometers per hour (km/h)). For such an application, the hydraulic assistance apparatus must satisfy certain additional constraints: firstly, it must guarantee full safety when the vehicle is traveling at high speeds, i.e. it must be almost impossible for the assistance motors to be triggered in untimely manner; secondly the apparatus must make it possible for the assistance motors to be switched on while the vehicle is advancing, and not merely when it is at a standstill or while it is traveling at very low speed (less than 5 km/h).

In such assistance apparatus, in known manner, a hydraulic pump having a variable delivery rate is used as the main pump. Such a pump makes it possible to adapt the speed of the motors as a function of need.

The invention relates in particular to hydraulic assistance apparatus including such a pump as the main pump, and more generally such apparatus in which the main pump is a pump that can be actuated without delivering, but that then requires some minimum pressure to be applied to its main orifices. If such pumps are actuated while pressure lower than the above-mentioned minimum pressure prevails in either of the main orifices of the pump, a risk of damaging the pump ensues.

However, it should be noted that the invention does not relate to hydraulic transmission apparatus equipping vehicles in which the main transmission is itself hydraulic, and therefore includes a main pump actuated substantially continuously while the vehicle is operating.

In assistance apparatus such as the apparatus to which the invention relates, since the assistance apparatus is used only occasionally, the problem arises of activating the hydraulic transmission apparatus.

The solution usually chosen consists in providing a clutch system, interposed between the internal combustion engine of the vehicle or of the machine and the main pump of the apparatus. Unfortunately, such a clutch system is quite costly, occupies a large volume, and requires a considerable amount of maintenance.

For hydraulic assistance systems, in addition to providing a clutch system, it is necessary to provide hydraulic motors having radial pistons of the positively declutchable type, thereby making it possible to avoid the motors rotating unloaded. Such a motor has a cylinder block in which cylinders are arranged for slidably receiving the pistons. Such a motor is suitable for taking up a work configuration, in which the pistons can generate drive torque or braking torque under the effect of a fluid pressure difference between the motor ducts, and a "freewheel" configuration, in which the pistons are maintained in a retracted position inside the cylinders and do not generate any torque. The pistons are maintained in the retracted position under the effect of mechanical means such as springs or the like, and/or under the effect of a pressure prevailing in a space internal to the motor that is arranged, in general, inside the casing that contains the cylinder block.

In such hydraulic transmission apparatus including such motors, it is useful at all times to have at least some minimum pressure that can be applied to the insides of the internal spaces of the motors and thus that can maintain said motors in the positively declutched positions, with their pistons retracted into their cylinders.

The improvement adopted in such circuits consists in making provision for the main pump to be declutchable by means of a clutch, but conversely for the internal combustion engine to actuate the auxiliary pump or booster pump of the apparatus continuously. Said auxiliary pump or booster pump then guarantees that some minimum pressure is delivered continuously, which pressure can be used to keep the motors safe in the positively declutched state.

Since the main pump is declutched when no assistance is requested, this guarantees that there is no risk of it being damaged under the effect of insufficient pressure at its main orifices.

That improvement still suffers from the drawback of using a clutch, but it does procure a certain amount of safety for use of the described positively declutchable hydraulic motors. However, the auxiliary pump being driven continuously gives rise to non-negligible power consumption. In addition, the internal combustion engine has to have two outlets, one towards the clutch connected to the main pump, and the other towards the auxiliary pump. This gives rise to compactness problems, and requires the internal combustion engine to have a specific design.

OBJECT AND SUMMARY OF THE INVENTION

An object of the invention is to propose a transmission system for a vehicle, the system including a non-hydraulic main transmission suitable for driving vehicle mover members, and an auxiliary transmission constituted by hydraulic transmission apparatus for a vehicle, the apparatus including:

a main pump serving to feed at least one hydraulic motor with fluid;

an auxiliary pump serving to maintain some minimum fluid pressure in at least one auxiliary duct; and a pressure limiter connected to a delivery orifice of the auxiliary pump;

the main pump and the auxiliary pump being suitable for being actuated jointly by drive means for the purpose of delivering pressurized fluid; and said at least one motor serving to drive at least one vehicle mover member;

which apparatus has power consumption that is relatively low and uses means that are simple and that require low maintenance.

This object is achieved by means of the fact that the apparatus further includes:

a "bypass" connection between a delivery orifice of the auxiliary pump and an unpressurized reservoir;

first constriction means arranged on the bypass connection and suitable for maintaining a pump protection pressure, said pump protection pressure being less than a calibration pressure of said pressure limiter; and means for applying said pump protection pressure to main orifices of the main pump when said pump is actuated but is not delivering.

Advantageously, the system does not include any clutches, or at least it does not necessarily include any clutches.

However, in an embodiment, the system does include a clutch. By means of the apparatus, the system may then have a "clutched" operating mode in which the clutch remains clutched continuously, and is thus not used very much; this mode having passive stages, during which the main pump is not delivering, and the auxiliary pump maintains the pump protection pressure portion of the pump protection portion of the bypass connection, thereby ensuring that the main pump is protected, and active stages, during which the main pump is delivering and is actuating the hydraulic motor(s).

In order to enable such an operating mode (the clutched mode) to take place, the system then has a clutch, interposed between the drive means and the main and secondary pumps, and control means, suitable for placing the system in a "clutched" mode by activating the clutch. Said means for applying pump protection pressure to the main orifices of the main pump when said main pump is actuated but is not delivering perform their function continuously during the clutched mode.

It can be understood that the main pump is of the type that can be actuated without delivering, but that it then needs at least a predetermined minimum pressure to be applied to its main orifices. The main pump may, for example, be a rotary pump, and in particular a pump having a swashplate and axial pistons.

The pump protection pressure is a pressure that is greater than or equal to the above-mentioned predetermined minimum pressure.

By means of the invention, the apparatus is suitable for being operated in an "unassisted" mode, in which the main and auxiliary pumps are actuated, the pump protection pressure is applied to the main orifices of the main pump, and the main pump is protected.

Preferably, the pump protection pressure is set at the minimum value that suffices to protect the pump, or to a value close to that value. The pump protection pressure thus differs from the calibration pressure of the pressure limiter: this calibration pressure is set at a value that is relatively high, but that is, however, sufficiently low to ensure that ducts connected to the pressure limiter are protected. The pressure limiter is thus intended to be used only exceptionally, in the event of an abnormal pressure rise in said ducts, in order to avoid any damage in said ducts.

Unlike the calibration pressure, the pump protection pressure is set at a value that is relatively low, by the first restriction means, so that the auxiliary pump can deliver the fluid at said pressure possibly for long periods. In this way, in unassisted mode, firstly the main pump is not delivering and its power consumption remains tiny, and secondly the power consumption of the auxiliary pump is also tiny, because the pressure at its delivery orifice is set at the pump protection pressure, which is relatively low. As a result, advantageously, in unassisted mode, the power consumption of the hydraulic transmission apparatus remains low. The hydraulic system can thus be operated in such a manner that the main and auxiliary pumps are actuated continuously, the fluid then being delivered continuously by the auxiliary pump towards the unpressurized reservoir via the bypass duct.

The first restriction means may thus, for example, be arranged to maintain a pump protection pressure less than 20 bars, and preferably less than 10 bars. The pump protection pressure is no less than the pressure at the main orifices of the main pump that suffices for enabling the main pump to operate without being damaged.

In an embodiment, the apparatus includes a bypass valve interposed on said bypass connection and having:

a first position, in which said bypass valve enables the auxiliary pump to deliver through the bypass connection; and a second position, in which said bypass valve interrupts the flow through said bypass connection and enables fluid to pass towards said at least one auxiliary duct.

The bypass valve is thus actually a general activation/deactivation valve for the assistance circuit. It firstly has a deactivated mode (corresponding to the unassisted mode of the apparatus), in which mode minimum functions are provided by the apparatus, in particular by means of the fact that the boost pressure (pressure at the delivery orifice of the auxiliary pump) or a pressure dependent on the boost pressure can be applied at different sensitive points of the apparatus, in particular the internal spaces of the above-mentioned motor, so as to guarantee that the motor is maintained in the positively declutched position.

The bypass valve also has an activated mode, corresponding to the assisted mode of the apparatus, in which mode the booster pump is suitable for delivering pressurized fluid to various members of the apparatus via auxiliary ducts, in particular to the motors so as to facilitate positive clutching of the pistons (deployment of the pistons out of their cylinders).

In an embodiment, the apparatus includes:

two pump ducts connected to the main orifices of the main pump, and two motor ducts connected to the main orifices of said at least one motor; and an activation valve having two upstream ports suitable for being connected to the two pump ducts, and two downstream ports suitable for being connected to the two motor ducts;

said activation valve having a first position in which the two upstream ports are connected to respective ones of the two downstream ports, and a second position in which the two upstream ports are interconnected, and the two downstream ports are interconnected.

The activation valve is the valve that feeds said at least one assistance motor when it is activated (second position), or isolates it from the pump ducts (first position).

In an embodiment, the activation valve further includes a third upstream port suitable for being connected to a pressurizing fluid source; when the activation valve is in the first position, the third upstream port is connected to the two downstream ports and is thus suitable for being connected to the two motor ducts; when the activation valve is in the second position, the third upstream port is isolated. The connection established between the third upstream port and a pressurized fluid source thus makes it possible to impose a pressure in the motor ducts, which is particularly effective for facilitating deployment or retraction of the pistons relative to the cylinders of the motor.

This connection may, in particular, be used for filling and emptying of the motor ducts.

In an embodiment, the apparatus includes a first pilot valve having an outlet port connected to a hydraulic control chamber controlling the position of the activation valve, and an inlet port that is suitable for being connected to a pilot fluid source via said bypass valve, and said pilot valve is suitable for putting said pilot fluid source and said control chamber into communication with each other or for isolating them from each other. This arrangement offers the advantage of thus having the bypass valve and the first pilot valve in series, in the control line of the activation valve. Since it is necessary for two valves to be in specific positions in order to enable the pilot valve to be activated, the risk of accidental failure and thus of untimely and undesired activation of the assistance motor is reduced to the minimum. Naturally, the bypass and pilot valves should be arranged so that their respective default positions correspond to the positions in which no instruction for going into a second position or activation position is transmitted to the activation valve.

As indicated in the introduction, in the assistance apparatus concerned by the invention, and as a hydraulic motor, use is frequently made of a motor that has:
  a first motor duct for feeding said motor with fluid, and a second motor duct for discharging fluid from the motor, which motor ducts are suitable for being put into communication with cylinders arranged in a cylinder block and including pistons suitable for sliding in said cylinders; and
  a casing duct connected to an internal space arranged inside a casing containing the cylinder block;
  said at least one motor being suitable for taking up a work configuration, in which the pistons can generate drive torque or braking torque under the effect of a fluid pressure difference between the motor ducts, and a "freewheel" configuration, in which the pistons are maintained in the retracted position inside the cylinders and do not generate any torque.

In an embodiment of the invention using such a motor, the apparatus further includes an accumulator suitable for feeding both of the motor ducts, and suitable for feeding the casing duct for putting said casing duct under pressure. The use of an accumulator makes it possible to have a supplementary pressurized fluid source. Advantageously, the accumulator may, in particular, be used to accelerate retraction of the pistons into the cylinders, by imposing a pressure that is sufficiently high inside the internal space of the motor. Thus, in the apparatus, positive declutching is accelerated, thereby increasing the flexibility of use of the vehicle.

Similarly, the pressure delivered by the accumulator may be transmitted to the motor ducts in order to accelerate deployment of the pistons. The same accumulator may be used for facilitating both deployment and retraction of the pistons.

In an advantageous embodiment, the apparatus is arranged in such a manner as to enable the accumulator to be emptied via a constriction. Emptying the accumulator requires a certain non-zero length of time, during which the pressure in the vicinity of the accumulator decreases only very progressively. With this specific arrangement (in particular), putting the accumulator and the casing ducts into communication with each other can take place during the operation of emptying the accumulator.

In addition, the use of an accumulator can suffer from certain risks, in particular if the accumulator remains under pressure while the vehicle is being used, and more particularly for long periods and in unassisted mode, on the road.

In order to reduce this risk, in a preferred embodiment, the apparatus further includes an accumulator valve that has a port connected to the accumulator, and that has a first position, in which it connects said accumulator to a filling fluid source, and a second position, in which it isolates said accumulator from said filling fluid source. The accumulator valve procures considerable flexibility in managing the accumulator, in particular with a view to putting said accumulator under pressure only for the times for which it is necessary. The accumulator is then connected to the filling fluid source for a sufficient length of time, just before its use stage. This applies, in particular at the time of passing to assisted mode, during which time the pressure of the accumulator is used to facilitate and to accelerate deployment of the pistons out of the cylinders. Conversely, while the vehicle is traveling at high speed or is at a standstill, the accumulator can remain empty.

When the apparatus includes an accumulator, and an accumulator valve as described above, and in one embodiment, the bypass valve and the accumulator valve are coupled together, i.e. when the bypass valve is in the first position, the accumulator valve is in the first position, and when the bypass valve is in the second position, the accumulator valve is in the second position.

The advantage of this arrangement is that it makes it possible, when the bypass valve is in the first position, to put the accumulator and the auxiliary duct under pressure, and thus to use the accumulator in assisted mode. Conversely, in the second position, use of the accumulator is not possible, and is therefore disabled in unassisted mode, thereby procuring safety in use of the apparatus.

In an embodiment, in order to perform the coupling between the bypass valve and the accumulator, the accumulator valve has a hydraulic control chamber that is connected to a port of the bypass valve enabling the accumulator valve to be controlled by the bypass valve. Thus, the bypass valve is suitable for placing the accumulator in "pressurized" mode (the accumulator being connected to the auxiliary or booster pump) during the assisted mode, and for leaving the accumulator at zero pressure during the unassisted mode.

In an embodiment, one of said main and of said auxiliary pumps is suitable for being connected to the accumulator when said accumulator is connected to the motor ducts for putting said ducts under pressure. The motor ducts are then connected both to one of the pumps and to the accumulator, during the stage of putting said ducts under pressure. This makes it possible to accelerate filling the motor ducts with fluid and putting them under pressure, at the time of activation of the transmission apparatus.

In an embodiment, the apparatus further includes second constriction means, arranged on the bypass connection and suitable for maintaining a motor protection pressure, less than the pump protection pressure, in a motor protection portion of the bypass connection; and the motor has an internal space arranged inside a casing containing the cylinder block, to which space said motor protection portion can be connected. This feature is provided for the unassisted mode. In this mode, the fluid delivered by the auxiliary pump flows through the bypass connection. Under these conditions, the second constriction means maintain a "motor protection" pressure in a "pump protection connection" portion of said connection, which pressure is in general much lower than the pump protection pressure, and is sufficient to protect the motor(s). For example, for positively declutchable motors such as the above-described motors, the motor protection pressure is merely the pressure sufficient to maintain the pistons in the retracted position inside the cylinders, i.e. about 0.5 bars usually.

In an embodiment, the first restriction means include a first calibrated valve, calibrated to the pump protection pressure, and the second constriction means further include a second calibrated valve, calibrated to the motor protection pressure, said first calibrated valve and said second calibrated valve being arranged in series on the bypass connection.

In an embodiment, the drive means include an internal combustion engine having a power outlet to which the main and auxiliary pumps are coupled continuously, i.e. without any clutches.

BRIEF DESCRIPTION OF THE DRAWINGS

The invention can be well understood and its advantages appear more clearly on reading the following detailed description of an embodiment shown by way of non-limiting example. The description refers to the accompanying drawings, in which:

FIGS. 3 to 5 are diagrams showing the system of FIG. 1A in unassisted mode:

MORE DETAILED DESCRIPTION

Figures 1A, 1B:
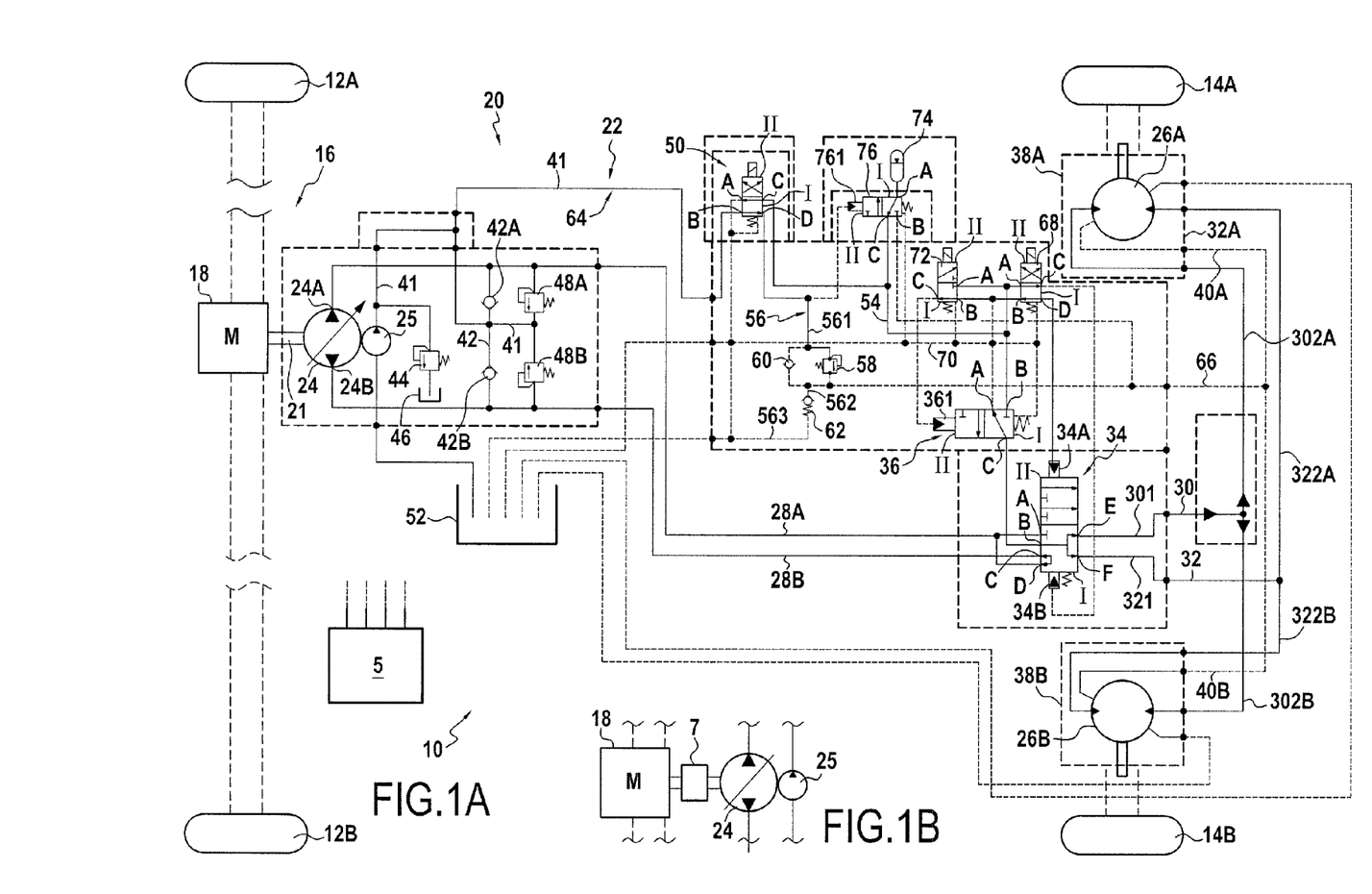
FIG. 1A is a generic diagram of a vehicle on which a system of the invention is mounted.
FIG. 1B is a detail view showing a variant of the system of FIG. 1A, in which a clutch is disposed between the motor and the pumps.

FIG. 1A shows a vehicle 10 on which hydraulic transmission apparatus 22 that is part of a transmission system of the invention is mounted.

The vehicle 10 is a vehicle having four wheels, namely two rear wheels 12A & 12B and two front wheels 14A & 14B. The drive for the vehicle is delivered mainly by a main transmission 16. Said main transmission includes a diesel engine 18 ("drive means" in the meaning of the invention) that is connected to the rear wheels 12A & 12B and that drives the vehicle in a normal advance mode of said vehicle.

In addition, in order to ensure that the vehicle is propelled even under difficult road conditions (sloping or downhill road, slippery road, etc.), the vehicle also has an auxiliary transmission 20. Said auxiliary transmission serves to drive the two wheels 14A and 14B that are not driven wheels while the vehicle is in normal advance mode. Thus, by means of the auxiliary transmission 20, the vehicle has an assisted mode in which all four wheels 12A, 12B, 14A and 14B are driven wheels.

The auxiliary transmission 20 is coupled to a shaft 21 that is the power outlet of the engine 18, from which it takes the power that it transmits to the wheels 14A & 14B when it is activated.

The auxiliary transmission 20 is constituted by hydraulic transmission apparatus 22 that transmits a fraction of the power from the engine 18 to the wheels 14A & 14B, and that also performs various additional functions: activation/deactivation of the auxiliary transmission, making the members of the auxiliary transmission safe during the deactivated mode, etc.

For driving the wheels 14A, 14B, the hydraulic transmission apparatus 22 firstly includes two pressurized fluid sources: a main pump 24, and an auxiliary pump 25 for maintaining some minimum fluid pressure in various auxiliary ducts of the apparatus.

The main pump 24 is a reversible pump having a variable delivery rate and a swashplate.

Both the main pump 24 and the auxiliary pump 25 are connected to the outlet shaft 21 of the engine 18 directly, i.e. without any clutches. They can thus be actuated jointly by the engine 18, i.e. both pumps can be driven at the same time.

The main pump 24 serves to feed pressurized fluid to two hydraulic motors 26A, 26B that are coupled to respective ones of the two wheels 14A, 14B. For this purpose, the pump 24 has two pump ducts 28A, 28B connected to respective ones of its main orifices 24A, 24B.

Said orifices can be put into communication with respective ones of two motor ducts 30, 32. Each of said motor ducts has a first portion 301, 321 suitable for being connected to a pump duct, and a second portion in which it splits into two branches 302A, 302B, 322A, 322B connected to respective ones of feed and discharge enclosures of the motors 26A and 26B.

In a manner known per se, the motors 26A, 26B are hydraulic motors having radial pistons, each of which motors comprises a cylinder block in which cylinders are arranged that contain pistons. The pistons can be positively declutched to take up a retracted position in which they are retracted into the cylinders and in which they do not deliver any torque, or they can be positively clutched to take up a deployed position, in which they (partially) extend from the cylinders and come to bear on an undulating cam that transforms their radial forces into drive torque. Such motors are, for example, described in French Patent No. 2 504 987.

Each of the motors 26A, 26B has an outlet shaft coupled to a respective one of wheels 14A & 14B. Under the effect of the pressure difference imposed by the main pump between the pump ducts, and thus between the motor ducts, in assisted mode, the motors 26A and 26B deliver drive torque (or braking torque) that enables them to drive the wheels 14A & 14B.

An activation valve 34 is interposed between the pump ducts 28A, 28B and the motor ducts 30, 32. Said activation valve has four "upstream" ports A, B, C, D, two "downstream" ports E and F, two positions I & II, and two hydraulic control chambers 34A & 34B. In this text the terms "upstream" and "downstream" as applied to the ports of a valve designate, in general, the most frequent direction of flow of the fluid, or of transmission of an instruction, without this excluding other operating modes.

Ports A and D are connected to pump duct 28A. Port C is connected to pump duct 28B. Ports E and F are connected to motor ducts 30 and 32. Port B is connected to a pressure control valve 36.

The activation valve 34 also has a return spring that tends to maintain it in its first position I.

In the first position I, port A is isolated, port B is connected to ports E and F, and ports C and D are interconnected.

In the second position II, ports B and D are isolated, ports A & E are interconnected and ports C & F are interconnected (ports A & D remain interconnected and connected to pump duct 28A).

Thus, in the first position I, pump ducts 28A & 28B are interconnected (bypass position); the pump is then set to a delivery rate of zero. In addition, the motor ducts are interconnected, and their pressure is the pressure that is imposed on them by the pressure control valve 36, in a manner described below.

Conversely, in the second position II, the motor ducts are connected to the pump ducts and they feed the motors 26A & 26B so that they drive the wheels 14A & 14B, which constitutes the assisted mode of the apparatus.

In addition, each of the motors 26A & 26B has a casing 38A, 38B containing its cylinder block. An internal space is provided inside the casing, and is connected to a duct for casing duct leak return (references 40A & 40B) connected to an unpressurized reservoir in a manner described in detail below.

The delivery orifice of the auxiliary pump 25 is connected to a boost duct 41.

The boost duct 41 is connected to the pump ducts 28A, 28B via non-return or "check" valves 42A, 42B. This connection makes it possible to ensure that the pressure in the pump ducts remains at all times at the level of the boost pressure (pressure at the delivery orifice of the pump 25).

In addition, the duct 41 is connected to an unpressurized reservoir 46 that is at atmospheric pressure, via a pressure limiter 44 that prevents any excessive rise in pressure in the duct 41.

Similarly, the pump ducts 28A, 28B are connected to the duct 41 via pressure limiters 48A, 48B, also in order to avoid any excessive pressure.

A "bypass" solenoid valve 50 is disposed on the boost duct. Said solenoid valve has two upstream ports A and B, two downstream ports C and D, and two positions I and II.

Port A is connected to an unpressurized reservoir 52 (which may the same as the reservoir 46). Port B is connected to an end of the boost duct 41. Port C is connected to a "transmission" duct 54, the purpose of which is described in more detail below. Port D is connected to a "bypass" duct 56.

The bypass valve 50 also has a return spring that tends to maintain it in its first position I.

In the first position I, ports A and C are interconnected, and ports B and D are interconnected.

In the second position II, ports A and D are interconnected, and ports B and C are interconnected.

The first position I is a default position for the bypass valve 50 and is the "deactivated" position, corresponding to the "unassisted" mode (normal advance mode). In this position, the fluid coming from the booster pump is directed towards the boost duct 56, and the transmission duct 54 is maintained at zero pressure (which, in this document, means atmospheric pressure).

The second position II of the bypass valve is the "activated" mode of the transmission apparatus 22, corresponding to the "assisted" mode for the vehicle. In this second position, the bypass valve directs the flow from the booster pump towards the transmission duct 54, which is an auxiliary duct of the apparatus 22.

The bypass duct 56 has three portions, namely an upstream portion 561, a middle portion 562, and a downstream portion 563.

The upstream portion 561 and the middle portion 562 are interconnected via a pressure limiter 58 and via a check valve 60 that are mounted in parallel. The check valve is mounted in the direction that prevents the fluid from flowing towards the middle portion 562.

The pressure limiter 58 is controlled by its upstream pressure, and makes it possible to maintain a minimum pressure in its upstream portion 561 that is chosen to be equal to 10 bars.

The middle portion 562 and the downstream portion 563 are interconnected via a calibrated valve 62. Said calibrated valve guarantees that a minimum pressure is maintained in the middle portion that is chosen to be equal to 0.5 bars.

The boost duct 41 associated with the bypass duct 56 form a "bypass" connection 64. Said bypass connection thus interconnects the delivery orifice of the auxiliary pump 25 and the unpressurized reservoir 52.

As explained above, the boost duct 41 is connected to the pump ducts 28A and 28B (via the valves 42A, 42B).

Thus in assisted mode (valve 50 in position I), the pressure of 10 bars (more precisely 10.5 bars) maintained by the pressure limiter 58 in the upstream portion of the bypass connection (uniting the boost duct 41 and the upstream portion 561 of the bypass duct) applies in the pump ducts; as a result, the pump is protected. The pressure maintained by the limiter 58 is thus a "pump protection" pressure, and the upstream portion of the bypass link is thus a "pump protection" portion.

The middle portion 562 of the bypass duct 56 is connected via a duct 66 to the casing ducts 40A and 40B. Thus, the pressure in the casing ducts remains at all times no more than 0.5 bars (calibration pressure of the valve 62). However, in transient manner, the pressure can increase to a greater extent in said middle portion 562 since the maximum flow rate that the valve 62 can remove is relatively limited. This property is used in the circuit in a manner that is described in detail below.

The activation valve 34 is controlled by a first pilot valve 68.

Said first pilot valve is a solenoid valve having two upstream ports A & B, and two downstream ports C & D, and two positions I & II.

Port A is connected to the transmission duct 54. It can be understood that said transmission duct transmits a boost pressure that the first pilot valve 68 can use to control the activation valve. Port B is connected to a removal duct 70 that is itself connected to the unpressurized reservoir 52. Port C is connected to the hydraulic chamber 34B of the valve 34, the increase in the pressure of which chamber tends to cause the activation valve 34 to go into its first position (unassisted mode); port D is connected to the other chamber 34A of the valve 34, the increase in the pressure of which chamber tends, conversely, to cause the valve 34 to go into its second position (assisted mode).

The first pilot valve 68 also has a return spring that tends to maintain it in the first position I.

In the first position I, ports A and C are interconnected, and ports B and D are interconnected; and, in the second position II, ports A and D are interconnected, and ports B and C are interconnected.

Since the first pilot value 68 is situated downstream from the bypass valve 50, it is active only when the bypass valve is in position II, and thus only when the boost pressure is prevailing in the transmission duct 54.

Under these conditions, action on the valve 68 makes it possible to cause the activation valve to go into position I or into position II, depending on whether the pilot valve is itself placed in position I or in position II. When the first pilot valve 68 is in position I, the boost pressure is transmitted into the chamber 34A, and zero pressure is maintained in the chamber 34B, so that the activation valve 34 is placed in position I (unassisted mode); and vice versa.

The apparatus 22 also has a second pilot valve 72 that controls the pressure control valve 36.

Firstly, the arrangement of the hydraulic valve 36 is specified below. This valve has two upstream ports A and B, one downstream port C, and a hydraulic control chamber 361. Port C of the valve 36 is connected to port B of the activation valve 34.

The valve 36 has two positions I and II.

In the first position I, the ports A and C are interconnected, and port B is isolated. In the second position II, ports B and C are interconnected, and port A is isolated.

The valve 36 also has a return spring that tends to maintain it in the first position I.

The second pilot valve 72 is a solenoid valve having two upstream ports A and B, and one downstream port C.

Ports A and B are connected respectively to the transmission duct 54 and to the removal duct 70. Port C is connected to the hydraulic control chamber 361 of the pressure control valve 36.

The second pilot valve 72 also has a return spring that tends to maintain it in the first position I.

In its first position I, the second pilot valve 72 interconnects ports B and C, A remaining isolated. In the second position II, the second pilot valve 72 interconnects A and C, B remaining isolated.

Like for the first pilot valve, the valves 36 and 72 are active only during the assistance stages, i.e., in this example, when the bypass valve 50 is placed in position II. The boost pressure then prevails in the transmission duct 54 (connected to port A of the valve 72), while zero pressure prevails in the removal duct 70 (connected to port B of the valve 72).

Under these conditions, the valve 72 makes it possible to apply either the boost pressure or a zero pressure to the hydraulic control chamber 361 of the valve 36, depending on whether it is placed in its first or in its second position. The pressure in the chamber 361 constrains the valve 36 to take up its first position I if the valve 72 is in its first position I, or to take up its second position if the valve 72 is in its second position II.

This arrangement thus makes it possible to select the pressure that it is desired to apply to port B of the activation valve 34. When said activation valve is in its first position I, the pressure in port B is transmitted to the motor ducts 30, 32 (conversely, when the activation valve is in the second position II, port B is isolated).

Finally, the apparatus 22 has an additional pressurized fluid source, namely a fluid accumulator 74, operation of which is regulated by an accumulator valve 76, disposed on an accumulator duct that connects the accumulator 74 to the remainder of the apparatus.

The accumulator valve 76 has an upstream port A, two downstream ports B and C, and a hydraulic control chamber 761. Port A is connected to the accumulator. Port B is connected to the middle portion 562 of the bypass duct 56, via the duct 66. Port C is connected to the transmission duct 54.

The accumulator valve 76 can take up a first position I, in which the valves A and C are interconnected, and the port B is isolated; and a second position II, in which the ports A and B are interconnected, and the port C is isolated.

The accumulator valve 76 has a return spring that tends to urge it to return to its first position I.

The control chamber 761 of the accumulator valve 76 is connected to the upstream portion 561 of the bypass duct 56. As a result of this connection:

If the bypass valve 50 is in position I (unassisted mode), the boost pressure (the value of which in this mode is set at a "pump protection" value) applies in the hydraulic chamber 761 and thus, the accumulator valve is placed in position II, in which the accumulator is connected to the middle portion of the bypass connection, maintained at a pressure of 0.5 bars (motor protection pressure). Thus, the accumulator is not really put under pressure and is in no way dangerous;

Conversely, if the bypass valve 50 is in position II (assisted mode), zero pressure is applied to the hydraulic chamber 761. The accumulator valve is placed in position I, i.e. the accumulator is connected to the transmission duct 54.

As a result of the connection between the port D of the bypass valve and the hydraulic control chamber 761, the accumulator valve and the bypass valve are coupled together, and the position of the bypass valve imposes its position on the accumulator valve.

Operation of the hydraulic transmission apparatus 22 is described below.

Figure 2:
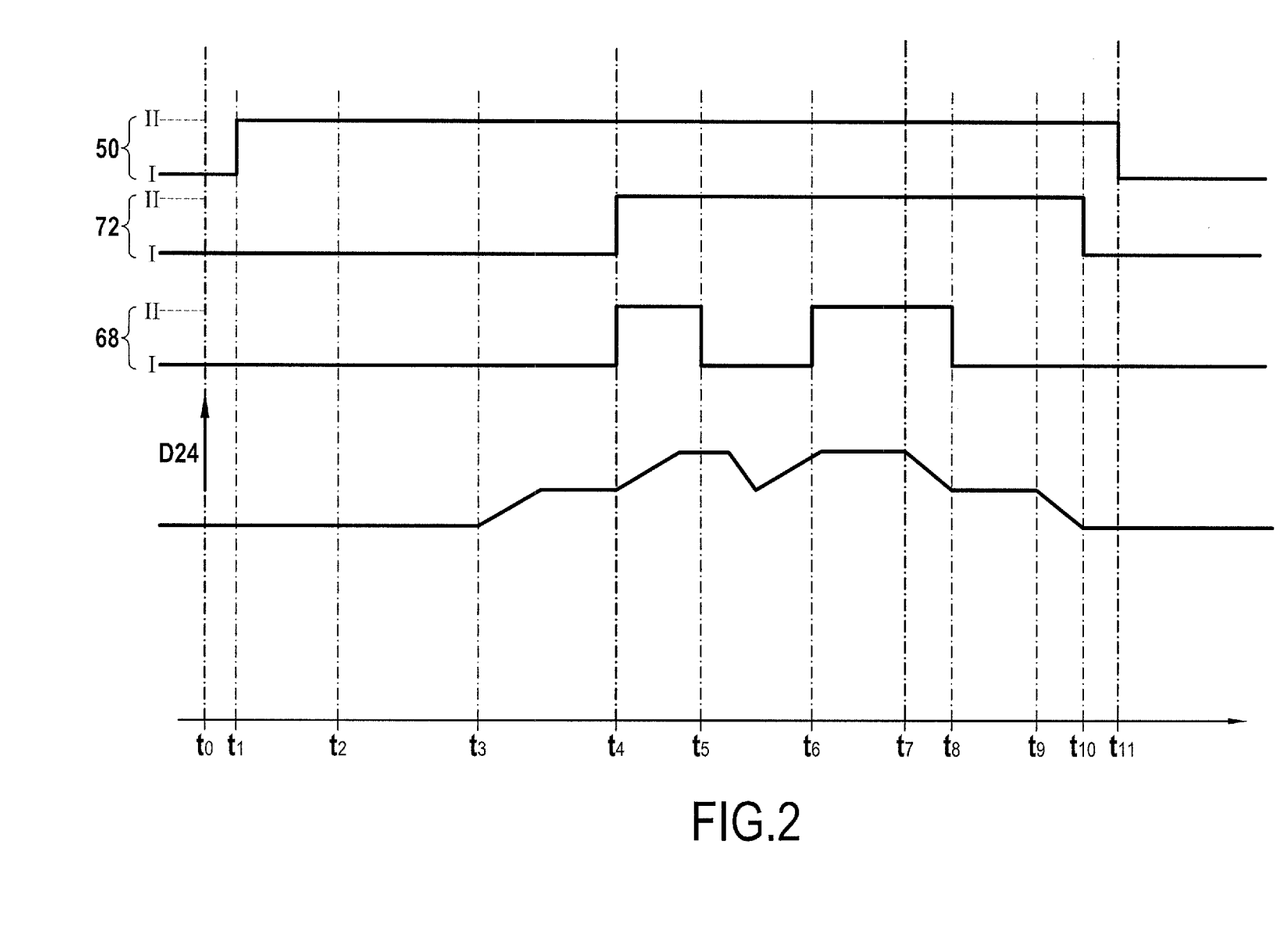
FIG. 2 is a timing diagram showing the various stages in implementing the hydraulic transmission apparatus of the system of FIG. 1A, as a function of time.
Figure 3:
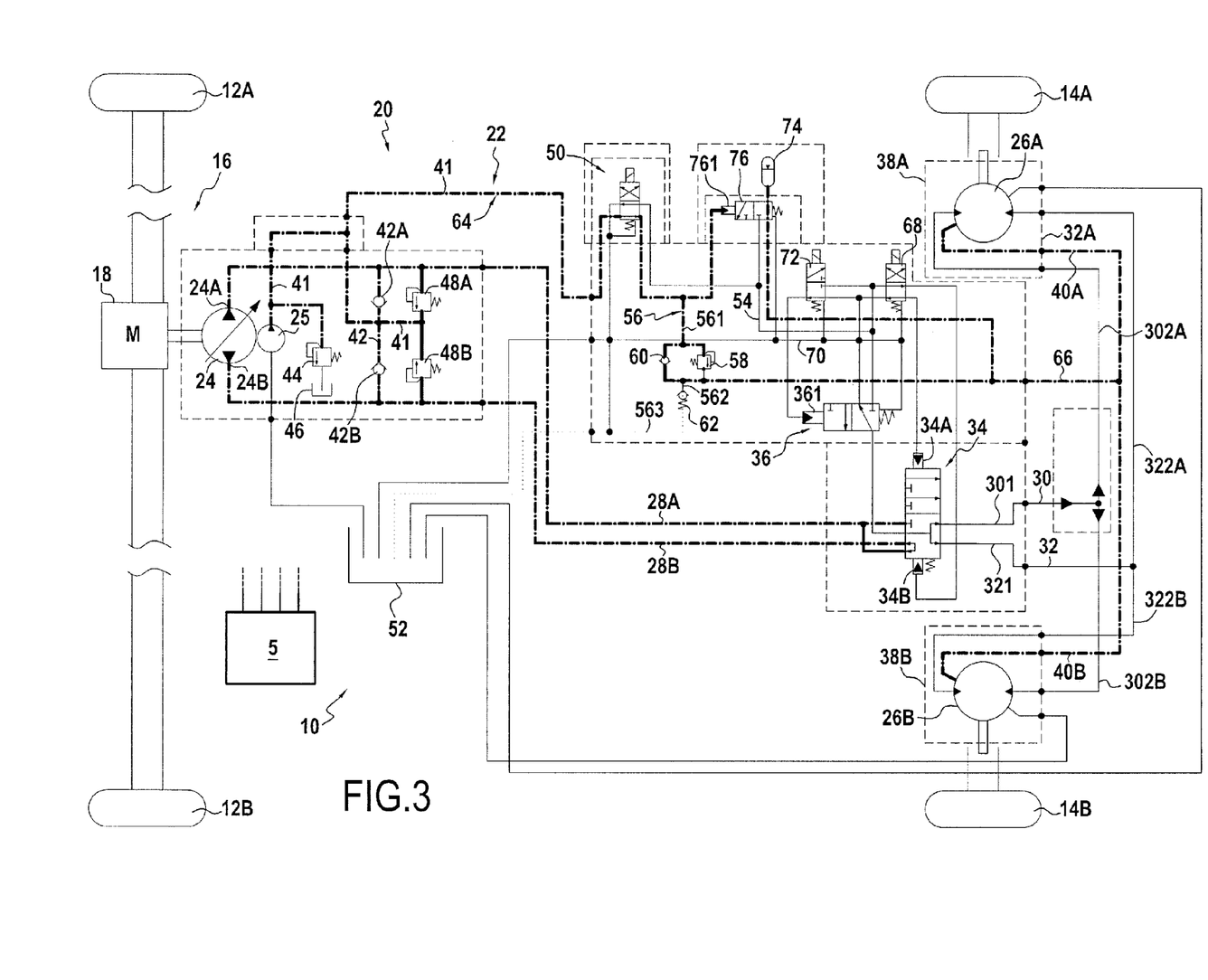
FIG. 3 is a diagram showing the system of FIG. 1A in freewheel mode and during the step of retracting the pistons.
Figure 4:
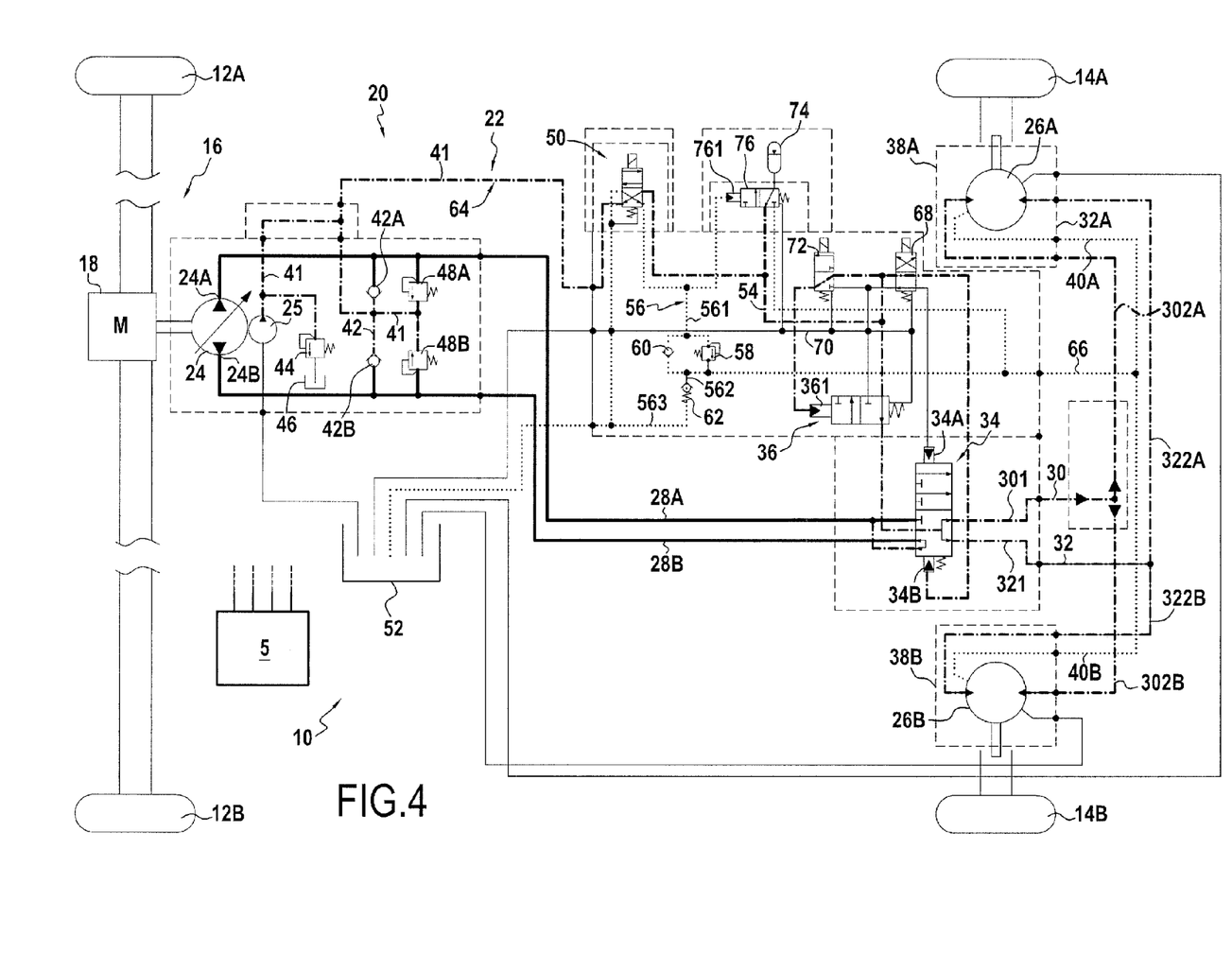
FIG. 4 is a diagram showing the system of FIG. 1A, during the step of deploying the pistons.
Figure 5:
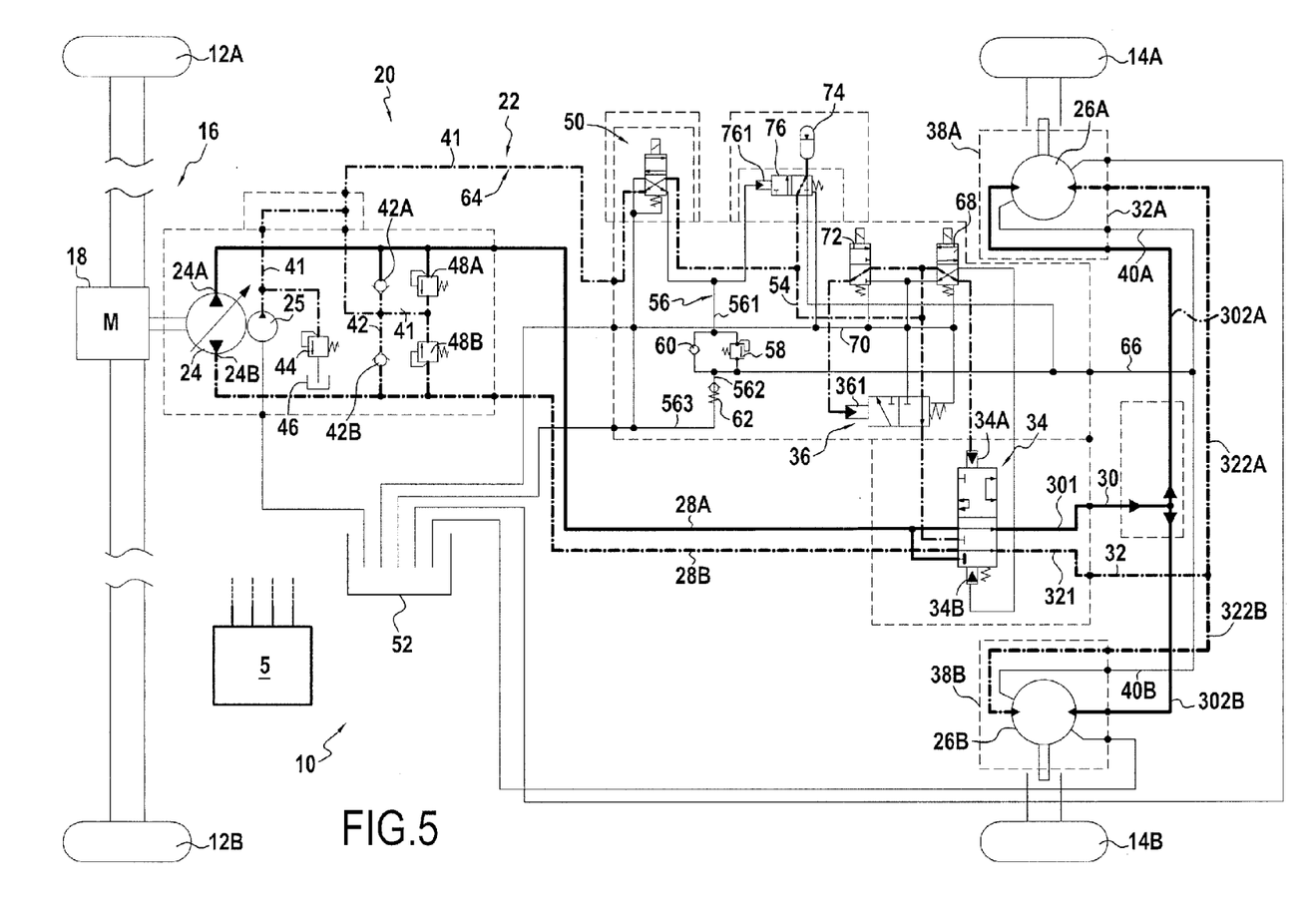
FIG. 5 is a diagram showing the system of FIG. 1A, in assisted mode.

The hydraulic transmission apparatus 22 is used by complying with certain stages marked mainly by activation or deactivation actions performed on the various valves. The sequence of going from the unassisted mode to the assisted mode, and vice versa, is shown in FIG. 2. Certain significant steps in this sequence are shown in FIGS. 3 to 5.

Sequencing of the various steps is controlled automatically by an electronic control unit (ECU) 5, on the basis of the assistance activation request (or of the assistance deactivation request) by the driver of the vehicle. The ECU 5 is shown in particular in FIG. 1A, in which, however, the connections between the ECU 5 and the control members of the transmission system are not shown. Said ECU 5 is suitable for taking certain protective measures for protecting the hydraulic transmission apparatus 22, while certain actions are being taken by the driver, such as gear-changing or braking, as described below.

In addition, another embodiment of the invention, similar to the system shown in FIG. 1A, may be implemented. In this other embodiment, the transmission system is entirely identical to the system shown in FIG. 1A except for the detail shown in FIG. 1B. In this other embodiment, the transmission system includes a clutch 7 arranged between the engine 18 and the pumps 24 and 25, and the ECU 5 is arranged to place the transmission system in the above-mentioned "clutched" operating mode, i.e. said ECU makes it possible to activate or deactivate the clutch. In the clutched mode, the means for applying the pump protection pressure to the main orifices of the main pump when said main pump is actuated but is not delivering perform their function continuously, in the manner that is described below, and that is identical for the system of FIG. 1A and for the system of FIG. 1B.

FIG. 2 shows, and as a function of time, the positions taken up by the first bypass valve 50, and by the first and second pilot valves 21 and 23. Underneath those curves lies a curve showing the variations in the cylinder capacity D24 of the main pump 24.

Time is plotted along the abscissa, with, in particular, significant times t0 to t11. The timing diagram shows a fictitious scenario for use of the apparatus 22, in which scenario, starting from the unassisted mode, at a time t0, an assistance activation instruction is issued by the driver of the vehicle. An assistance preparation first stage takes place from t0 to t4. As from time t4, assistance is active until time t7. However, the scenario in FIG. 2 makes provision for a momentary assistance declutching stage from time t5 to t6. Finally, at a time t7, an assistance disengagement request is made by the driver, and the hydraulic assistance apparatus goes from the assisted mode to the unassisted mode from t7 to t11.

Unassisted Mode (FIG. 3)

In this mode, the bypass valve is in position I, and the fluid delivered by the booster pump 25 flows through the bypass connection 64 to return to the reservoir 52, thereby following a relatively short circuit, without using the various valves of the apparatus 22 (except for the bypass valve 50). The accumulator valve 76 is in position II. The accumulator empties via the valve 62 of the bypass connection. The activation valve 34, the pilot valves 68 and 72, and the pressure control valve 36 are in position I. The pump protection pressure prevails in the upstream portion of the bypass connection 64, and therefore in the pump ducts, thereby making it possible to protect the main pump 24. Said main pump is being driven by the engine 18, but is not delivering.

Since the pump protection pressure is low (10 bars), the power consumption by the auxiliary pump or booster pump 25 remains very low.

The casing ducts 40A and 40B are connected to the middle portion 562 of the bypass duct, in which a pressure of 0.5 bars prevails. This pressure is sufficient to guarantee that the pistons remain in the retracted positions inside the cylinders (and is chosen for the purpose).

Pass to Assisted Mode

Activate the Bypass Valve

At time t0, the driver issues an assistance instruction for putting the transmission of the vehicle in assisted mode, i.e. for activating the auxiliary transmission 20.

After a brief interval, at time t1, the ECU activates the bypass valve 50 and places it in position II.

The accumulator valve 76 reacts immediately and goes from position II to position I. The accumulator is thus connected to the booster pump via the boost duct and via the transmission duct 54. It fills and rapidly reaches the pressure delivered by the booster pump. Conversely, the casing ducts 40A, 40B empty into the reservoir 52, via the valve 60 and via the valve 50.

Synchronize the Pump and Deploy the Pistons (FIG. 4)

The accumulator is full at time t2. The ECU then, at time t3, triggers synchronization of the main pump 24, by progressively increasing the cylinder capacity of the pump, to a target value at which the cylinder capacity is stabilized. This target value is determined by the ECU in such a manner that the pump drives the motors 26A and 26B at a speed of rotation equal to the speed of rotation of the wheels of the vehicle. The instant t3 is determined by the ECU either after a set lapse of time after t2 (0.5 seconds), or by a pressure reached on a pressure switch.

The pistons, which were previously retracted into the cylinders, are then deployed from their cylinders at time t4, and placed in the working position, i.e. in contact with the cam. This operation is triggered by activating the second pilot valve 72 that passes to position II. As a result, the boost pressure applies in the hydraulic chamber 361, thereby causing the pressure control valve 36 to pass to position II. As a result, the pressure applied in the port B of the activation valve 34, and therefore in the motor ducts 30, 32 rises, and reaches the boost pressure.

Under the effect of this pressure, and since, conversely, the casing ducts 40A, 40B remain at zero pressure, the pistons extend from their cylinders, thereby enabling the rotors of the motors to turn at the same speed as the wheels, the delivery rate of the pump adapting to said speed. At this stage, the motors do not, however, deliver any torque.

Simultaneously with the pistons being deployed out of the cylinders, the casing ducts 40A, 40B that are connected to the middle portion 562 of the bypass duct 56 remove the fluid from the internal spaces of the motors 26A, 26B via the check valve 60, towards the reservoir 52.

Advantageously, during this stage, the accumulator 74 is put in line at the same time as the booster pump 25 so as to deliver the fluid and so as to fill the motor ducts 30 and 32. The accumulator thus facilitates and accelerates filling the motor ducts and bringing them up to pressure, and thus makes it possible for the motors 26A, 26B to be positively clutched quickly.

Activate the Assistance Motors (FIG. 5)

Either slightly after the step of synchronizing the pump, or simultaneously as shown in FIG. 2, the assistance motors are activated by placing the first pilot valve 68 in the second position II. This causes the activation valve 34 to go to position II and the respective pressures of the pump ducts 28A, 28B thus apply in the motor ducts 30, 32. Under the effect of the pressure difference between these ducts, the motors 26A and 26B are thus caused to operate and they drive the wheels 14A and 14B which thus become driven wheels.

The delivery rate of the pump is then progressively increased, as the speed of the vehicle increases.

During the assistance stage, the accumulator 74 is connected to the transmission duct 54 and remains subjected to the boost pressure.

Temporarily Deactivate the Assistance

If, during an assistance stage, it is necessary, for example, to brake or to change gear (on the motors 26A, 26B), the assistance apparatus 22 is deactivated temporarily during this stage.

This operation is performed (see FIG. 2) from times t5 to t6, during which period the second pilot valve 68 is placed temporarily in position I (deactivated position). As a result, during this period, the activation valve 34 also returns to position I, and thus the pressure balances out between the motor ducts. The motors 26A and 26B then, temporarily, no longer deliver any drive torque or any braking torque.

Return to Unassisted Mode

The return to unassisted mode takes place as follows:

At an instant t7, the driver of the vehicle transmits a return-to-unassisted-mode instruction to the ECU. Said ECU progressively reduces the delivery rate of the main pump 24, in order to reduce the assistance pressure to the minimum (to 30 bars) so as to reduce any jolts in the assistance motors.

Then, after a predetermined lapse of time, the motors 26A, 26B are deactivated by causing the first pilot valve 68 to go back to position I, thereby causing the activation valve 34 to go to position I. The cylinder capacity of the pump is then maintained constant for a short lapse of time (from times t8 to t9), and then the reduction in the delivery rate of the pump is resumed from times t9 to t10, whereupon the pump returns to zero delivery rate.

At this time t10, the second pilot valve 72 is deactivated, which enables the fluid contained in the motor ducts to be removed towards the reservoir 52, and enables the pressure in them to be caused to drop.

Then, the bypass valve 50 itself is deactivated at time t11. The valves are then in the positions shown by FIG. 3. However, initially the flows of fluid are totally different from the unassisted mode, in particular because the accumulator is initially under pressure (at the boost pressure).

The fluid delivered by the booster pump is, once again, directed towards the bypass duct 56. In addition, deactivation of the valve 50 causes the accumulator valve 76 to pass immediately to position II. The accumulator is then put into communication firstly with the casing ducts 40A, 40B via the duct 66, and secondly with the reservoir 52, via the calibrated valve 62.

The flow-rate of fluid that can pass through said valve 62 is, however, limited. Thus, when the accumulator 74 is put into communication with the duct 66, most of the fluid that it contains is removed towards the reservoir 52, but during the initial moments after the accumulator 74 and the duct 66 have been put into communication with each other, a non-negligible pressure is established in these ducts. This pressure is transmitted to the internal spaces of the motors 26A, 26B via the casing ducts 40A, 40B. Thus, the accumulator being put into communication makes it possible to accelerate retraction of the pistons into the cylinders.

At the end of these operations, the vehicle finds itself in unassisted mode, and the wheels 14A and 14B can turn freely, as in the initial situation.

It should be noted that it is also possible firstly to deactivate the bypass valve 50, and then to deactivate the second pilot valve 72. The choice of such a sequence facilitates rapid retraction of the pistons.

Figure 6A:
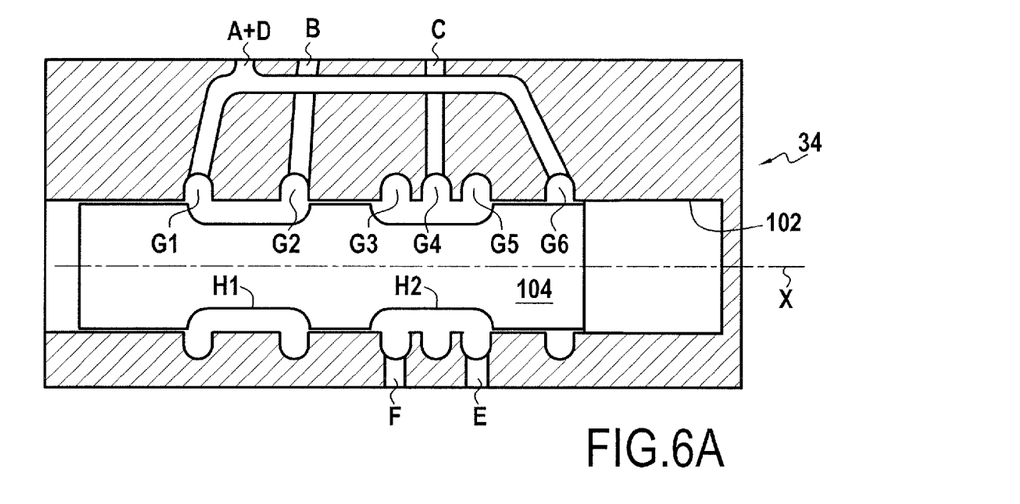
FIGS. 6A and 6B are diagrammatic axial section views of the activation valve of the system of FIG. 1A.
Figure 6B:
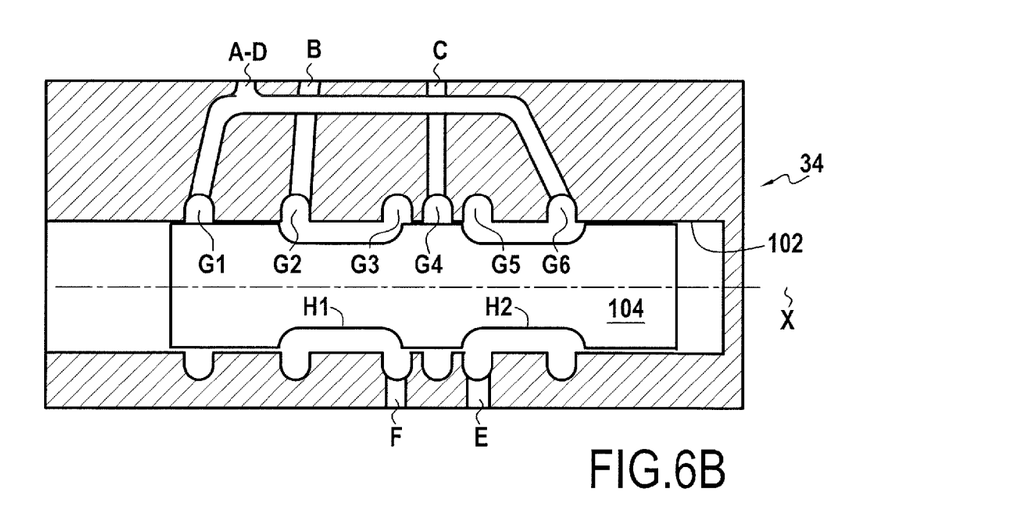

The arrangement of the valve 34 is described below with reference to FIGS. 6A and 6B.

This valve has a body 100 inside which a substantially cylindrical bore 102 is arranged along an axis X. A slide 104 that is substantially in the shape of a cylindrical segment is slidably received in the bore. Six circumferential grooves G1-G6 are also formed in the bore; two wide circumferential grooves H1-H2 are formed in the outside surface of the slide.

The valve 34 has four upstream ports A, B, C, and D, two of which (A and D) coincide in practice because they are interconnected via an internal duct 106. Port A-D is connected to the grooves G1 and G6; port B is connected to groove G2 via an internal duct, and port C is connected to groove G4 via an internal duct.

The valve 34 has two downstream ports E and F. Port E is connected to groove G5 via an internal duct, and port F is connected to groove G3 via an internal duct.

The slide is designed to take up two positions I and II.

In position I, i.e. in the unassisted position (FIG. 6A), the slide 104 is positioned on the same side as groove G1 (rather than on the same side as groove G6 along the axis X). In this position, groove H1 puts grooves G1 and G2 into communication with each other, and groove H2 puts grooves G3, G4, and G5 into communication with one another.

In position II, i.e. in the assisted mode (FIG. 6B), the slide 104 is positioned on the same side as the groove G6. In this position, groove H1 puts grooves G2 and G3 into communication with each other; groove H2 puts grooves G5 and G6 into communication with each other.

What is claimed is:

1. A hydraulic transmission system for a vehicle, the system including a non-hydraulic main transmission suitable for driving vehicle mover members, and an auxiliary transmission constituted by hydraulic transmission apparatus including:
   a main pump serving to feed at least one hydraulic motor with fluid;
   an auxiliary pump serving to maintain some minimum fluid pressure in at least one auxiliary duct; and
   a pressure limiter connected to a delivery orifice of the auxiliary pump;
   the main pump and the auxiliary pump being suitable for being actuated jointly by drive means for the purpose of delivering pressurized fluid; and
   said at least one motor serving to drive at least one vehicle mover member;
   wherein the apparatus further includes:
   a bypass connection between the delivery orifice of the auxiliary pump and an unpressurized reservoir;
   first constriction means arranged on the bypass connection and suitable for maintaining a pump protection pressure in a pump protection portion of the bypass connection, said pump protection pressure being less than a calibration pressure of said pressure limiter; and
   a duct for applying said pump protection pressure to main orifices of the main pump when said pump is actuated but is not delivering.

2. A system according to claim 1, in which the main pump is a rotary pump.

3. A system according to claim 1, wherein the first constriction means are arranged to maintain a pump protection pressure less than 20 bars.

4. A system according to claim 1, wherein the apparatus includes a bypass valve interposed on said bypass connection and having:
   a first position, in which said bypass valve enables the auxiliary pump to deliver through the bypass connection; and
   a second position, in which said bypass valve interrupts the flow through said bypass connection and enables fluid to pass towards said at least one auxiliary duct.

5. A system according to claim 1, wherein the apparatus includes:
   two pump ducts connected to the main orifices of the main pump, and two motor ducts connected to the main orifices of said at least one motor; and
   an activation valve having two upstream ports suitable for being connected to the two pump ducts, and two downstream ports suitable for being connected to the two motor ducts;
   said activation valve having a first position in which the two upstream ports are interconnected, and the two downstream ports are interconnected, and a second position in which the two upstream ports are connected to respective ones of the two downstream ports.

6. A system according to claim 5, wherein the activation valve further includes a third upstream port suitable for being connected to a pressurizing fluid source; when the activation valve is in the first position, the third upstream port is connected to the two downstream ports and is thus suitable for being connected to the two motor ducts; when the activation valve is in the second position, the third upstream port is isolated.

7. A system according to claim 5, wherein the apparatus includes a bypass valve interposed on said bypass connection and having:
   a first position, in which said bypass valve enables the auxiliary pump to deliver through the bypass connection; and
   a second position, in which said bypass valve interrupts the flow through said bypass connection and enables fluid to pass towards said at least one auxiliary duct; and
   wherein the apparatus includes a first pilot valve having an outlet port connected to a hydraulic control chamber controlling the position of the activation valve, and an inlet port that is suitable for being connected to a pilot fluid source via said bypass valve, and said pilot valve is suitable for putting said pilot fluid source and said control chamber into communication with each other or for isolating them from each other.

8. A system according to claim 1, wherein said at least one motor has:

a first motor duct for feeding said motor with fluid, and a second motor duct for discharging fluid from the motor, which motor ducts are suitable for being put into communication with cylinders arranged in a cylinder block and including pistons suitable for sliding in said cylinders; and a casing duct connected to an internal space arranged inside a casing containing the cylinder block;

said at least one motor being suitable for taking up a work configuration, in which the pistons can generate drive torque or braking torque under the effect of a fluid pressure difference between the motor ducts, and a freewheel configuration, in which the pistons are maintained in the retracted position inside the cylinders and do not generate any torque;

the apparatus further including an accumulator suitable for feeding both of the motor ducts, and suitable for feeding the casing duct for putting said casing duct under pressure.

9. A system according to claim 8, wherein the apparatus further includes an accumulator valve that has a port connected to the accumulator, and that has a first position, in which it connects said accumulator to a filling fluid source, and a second position, in which it isolates said accumulator from said filling fluid source.

10. A system according to claim 9, wherein the apparatus includes a bypass valve interposed on said bypass connection and having:

a first position, in which said bypass valve enables the auxiliary pump to deliver through the bypass connection; and a second position, in which said bypass valve interrupts the flow through said bypass connection and enables fluid to pass towards said at least one auxiliary duct; and wherein the accumulator valve has a hydraulic control chamber that is connected to a port of the bypass valve enabling the accumulator valve to be controlled by the bypass valve.

11. A system according to claim 8, wherein one of said main and of said auxiliary pumps is suitable for being connected to the accumulator when said accumulator is connected to the motor ducts for putting said ducts under pressure.

12. A system according to claim 1, wherein the apparatus further includes second constriction means, arranged on the bypass connection and suitable for maintaining a motor protection pressure, less than the pump protection pressure, in a motor protection portion of the bypass connection; and wherein said at least one motor has an internal space arranged inside a casing containing the cylinder block, to which space said motor protection portion can be connected.

13. A system according to claim 12, wherein the first restriction means include a first calibrated valve, calibrated to the pump protection pressure, and the second constriction means further include a second calibrated valve, calibrated to the motor protection pressure, said first calibrated valve and said second calibrated valve being arranged in series on the bypass connection.

14. A transmission system according to claim 1, the drive means of which include an internal combustion engine having a power outlet to which the main and auxiliary pumps are coupled continuously, without the use of clutches.

15. A transmission system according to claim 1, further including:

a clutch, interposed between said drive means and the main and secondary pumps; and a controller configured to place the system in a clutched mode by activating the clutch;

the duct for applying pump protection pressure to the main orifices of the main pump when said main pump is actuated but is not delivering performing their function continuously during said clutched mode.

16. The hydraulic transmission system of claim 1, wherein the pump comprises a swashplate.

17. The hydraulic transmission system of claim 3, wherein the first constriction means are arranged to maintain a pump protection pressure of less than 10 bars.

* * * * *